(12) United States Patent
Agra-Gutierrez et al.

(10) Patent No.: US 7,476,704 B2
(45) Date of Patent: Jan. 13, 2009

(54) OPACIFIED POLYMER COMPOSITION

(75) Inventors: Cesar Agra-Gutierrez, St Austell (GB); Howard Goodman, Tregony (GB); Deeba Ansari, Truro (GB)

(73) Assignee: Imerys Minerals Limited, Par, Cornwall (GB)

( * ) Notice: Subject to any disclaimer, the term of this patent is extended or adjusted under 35 U.S.C. 154(b) by 568 days.

(21) Appl. No.: 10/508,994

(22) PCT Filed: Apr. 24, 2003

(86) PCT No.: PCT/GB03/01759

§ 371 (c)(1),
(2), (4) Date: Jun. 23, 2005

(87) PCT Pub. No.: WO03/091323

PCT Pub. Date: Nov. 6, 2003

(65) Prior Publication Data

US 2005/0239934 A1    Oct. 27, 2005

(30) Foreign Application Priority Data

Apr. 24, 2002    (GB) ................. 0209355.7

(51) Int. Cl.
*C08K 3/34*    (2006.01)
(52) U.S. Cl. .................. 524/447; 524/497; 524/567; 524/577; 524/584; 524/586
(58) Field of Classification Search ........... 524/447, 524/497, 584, 586, 577, 567
See application file for complete search history.

(56) References Cited

U.S. PATENT DOCUMENTS

| | | | |
|---|---|---|---|
| 3,725,520 A * | 4/1973 | Suzuki et al. .......... 264/41 |
| 3,951,680 A * | 4/1976 | Robertson et al. ...... 106/454 |
| 4,242,287 A | 12/1980 | Allen |
| 4,303,595 A | 12/1981 | Allen |
| 4,303,596 A | 12/1981 | Allen |
| 4,350,655 A | 9/1982 | Hoge |
| 4,677,141 A | 6/1987 | Cornelius et al. |
| 4,740,538 A * | 4/1988 | Sekutowski .......... 523/205 |
| 4,743,626 A | 5/1988 | Bersano |
| 4,806,424 A | 2/1989 | Schultz |
| 4,816,337 A | 3/1989 | Schultz |
| 5,244,958 A | 9/1993 | Goodman |
| 5,277,970 A * | 1/1994 | Schuhmann et al. ...... 428/323 |
| 5,416,133 A | 5/1995 | Garcia et al. |
| 5,536,116 A | 7/1996 | Lammers et al. |
| 5,565,503 A | 10/1996 | Garcia et al. |
| 5,571,851 A | 11/1996 | Freeman et al. |
| 5,582,890 A | 12/1996 | Davis et al. |
| 5,614,313 A | 3/1997 | Mills et al. |
| 5,620,281 A | 4/1997 | Lammers et al. |
| 5,624,488 A | 4/1997 | Forbus et al. |
| 5,854,327 A | 12/1998 | Davis et al. |
| 6,011,087 A | 1/2000 | Marshall et al. |
| 6,090,195 A | 7/2000 | Andersen et al. |
| 6,334,894 B1 * | 1/2002 | Kostuch .............. 106/486 |

FOREIGN PATENT DOCUMENTS

| | | |
|---|---|---|
| GB | 1 017 959 | 1/1966 |
| GB | 2 067 535 A | 7/1981 |
| GB | 2 225 328 A | 5/1990 |
| JP | 60-228557 | 11/1985 |
| JP | 11-5852 * | 1/1999 |
| WO | WO 93/08133 | 4/1993 |
| WO | WO 99/24360 | 5/1999 |
| WO | WO 99/61245 | 12/1999 |
| WO | WO 01/02475 | 1/2001 |

OTHER PUBLICATIONS

JP 11-5852 (Jan. 1999) translation in English.*

* cited by examiner

*Primary Examiner*—Bernard Lipman
(74) *Attorney, Agent, or Firm*—Finnegan, Henderson, Farabow, Garrett & Dunner, L.L.P.

(57) ABSTRACT

There is disclosed a polymer composition comprising a polymer resin and, as opacifier, a flash calcined kaolin clay filler and a $TiO_2$. The polymer composition may be formed into shaped articles, particularly polyolefin film.

48 Claims, 10 Drawing Sheets

OPACIFIED POLYMER COMPOSITION

FIELD OF THE INVENTION

This invention relates generally to the use of a flash calcined kaolin clay as an opacifier for a polymer composition, and more particularly to the use of flash calcined kaolin clay as a filler to fully or partially replace the titanium dioxide filler which is typically used as an opacifier in polyolefin polymer compositions, and products or articles formed therefrom. The invention also relates to methods of making such compositions, to products such as films formed from the polymeric compositions and to methods of making such products.

BACKGROUND OF THE INVENTION

The ability of a pigmented or filled polymer system to diffuse and reflect a portion of the incident light is known as its scattering power. The scattering power of a pigment or filler is directly linked to its hiding and opacifying power. The scattering power of a filler or pigment is related to two properties, refractive index and particle size distribution. The greater the difference between the refractive indexes of polymer and pigment or filler the greater the scattering power, and therefore the greater the opacity. $TiO_2$ rutile, with the highest refractive index of all common pigments (of the order of 2.55 for anatase and 2.7-2.75 for rutile), is the most efficient scatterer and is well known as an opacifying white pigment for polyolefin polymers, and in particular polyethylene products such as polyethylene film. However, titanium dioxide is an expensive material and so it would be desirable to be able to replace some or all of the titanium dioxide in polyolefin applications. In this respect, one known replacement, or partial replacement, opacifier is particulate calcium carbonate.

U.S. Pat. No. 5,571,851 describes the use of silane treated calcined clays as reinforcing fillers for plastics systems such as polyamides.

Flash calcined kaolin clay, which is made by a process in which a hydrous kaolin clay is exposed to an elevated temperature for a short period of time, for example a few seconds, is already known as a filler for elastomer compositions, see GB-A-2067535. Flash calcined clay has also been used for many years as an extender for titanium dioxide in paints (WO 99/24360).

BRIEF DESCRIPTION OF THE INVENTION

According to a first aspect of the present invention, there is provided a polymer composition comprising a polymer resin, an amount of a flash calcined kaolin clay filler and an amount of a titanium dioxide filler, wherein the weight ratio of the flash calcined clay to the titanium dioxide in the composition is in the range of up to 10:1 and wherein the polymer resin is one which hardens or cures to a plastic material which has a refractive index of at least about 1.45.

The polymer composition may be prepared as a masterbatch composition, which may then be "let down" to an appropriate filler content before formation of the final polymeric product, such as a film product, from the polymer composition.

According to a second aspect of the invention, there is provided a production process for preparing a polymer composition of the first aspect of the invention in which the flash calcined kaolin clay and the titanium dioxide are mixed with the polymer resin to form a homogenous composition.

According to a third aspect of the present invention there is provided a polymer article made from the polymer composition of the first aspect of the present invention. For example, the polymer article may be a polyolefin film. Thus, in one embodiment, the present invention relates to a polyolefin film, preferably a polyethylene film, formed from a polymer composition of the first aspect of the invention.

The use of flash calcined kaolin clay in plastics which have a refractive index of at least about 1.45 permits the amount of titanium dioxide, which is a relatively expensive raw material, to be reduced, while retaining satisfactory product characteristics, particularly the opacity and whiteness of the product. This is of particular use for products such as polyolefin, e.g. polyethylene, film.

Without wishing to be bound by theory, it is believed that the refractive index of particulate flash calcined clay (which has been measured to be of the order of about 1.39) enables it to be used as an opacifier (and particularly as a partial replacement for a proportion of a titanium dioxide opacifier) in respect of polymer systems which have a refractive index greater than about 1.45, without the particle size having to be unacceptably high.

The term "particle diameter" used herein refers to a particle size measurement as determined by laser light particle size analysis using a CILAS (Compagnie Industrielle des Lasers) 1064 instrument. In this technique, the size of particles in powders, suspensions and emulsions may be measured using the diffraction of a laser beam, based on application of the Fraunhofer theory. The term "mean particle size" or "$d_{50}$" used herein is the value, determined in this way, of the particle diameter at which there are 50% by volume of the particles which have a diameter less than the $d_{50}$ value. The preferred sample formulation for measurement of particle sizes using the CILAS 1064 instrument is a suspension in a liquid. The CILAS 1064 instrument normally provides particle size data to two decimal places, to be rounded up or down when determining whether the requirements of the present invention are fulfilled.

DETAILED DESCRIPTION OF THE INVENTION

Figure 1:
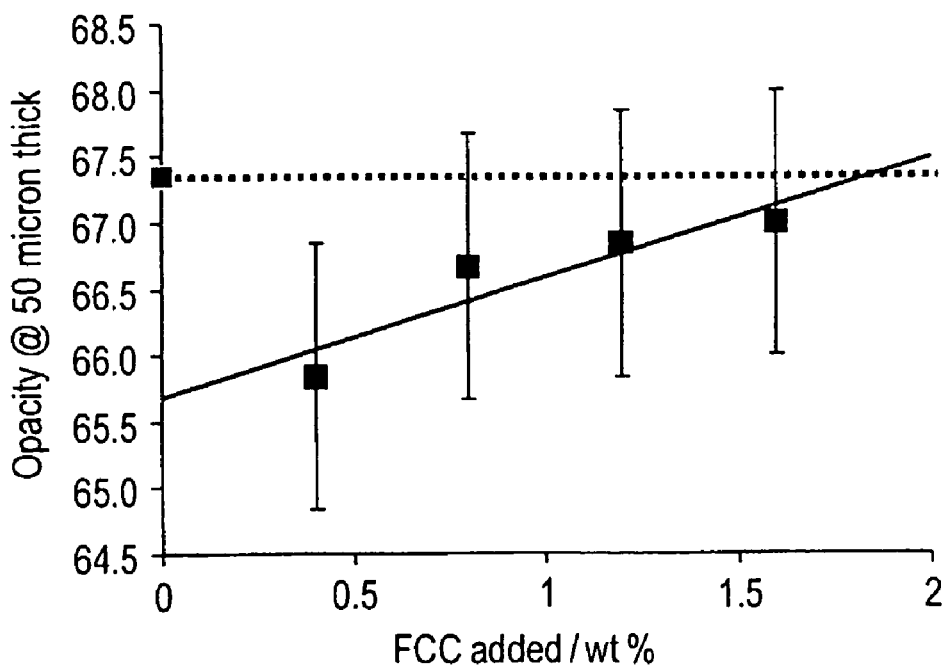
FIG. 1 shows opacity of polyethylene films made in Example 1 as a function of the level of the flash calcined kaolin clay for film with 3.6% $TiO_2$. The broken line represents the value at 0% flash calcined clay and 4% $TiO_2$.

The polymer composition of the invention comprises a polymer resin. "Resin" is the general term used in the plastics art to denote a polymeric material (solid or liquid) prior to shaping into a plastic article.

The polymer resin used in the present invention is one which, on hardening (in the case of thermoplastic plastics) or curing (in the case of thermosetting plastics), forms a plastics material which has a refractive index of at least about 1.45. The refractive index is as measured by ASTM D542.

Preferred polymer resins are polyolefin resins, for example homopolymers of an olefin such as ethylene, propylene, butene or the like, or copolymers of an olefin monomer and another monomer. Typical examples of polyolefin homopolymers are polyethylene resins such as low-density polyethylene (which has a refractive. index (RI) of 1.51), middle-density polyethylene (RI 1.52) and high-density polyethylene (RI 1.54), polypropylene resins, e.g. polypropylene atactic (RI 1.47) or polypropylene isotactic (RI 1.49), poly(4-methylpentene) resins and polybutene resins, such as polyisobutylene (RI 1.51). Also suitable for use in the invention is linear low-density polyethylene (LLDPE) (RI 1.51) which although sometimes referred to as a homopolymer of ethylene is in fact an ethylene-α-olefin copolymer made by copolymerising ethylene with an α-olefin co-monomer, normally butene, hexene or octene. Polyolefin copolymers which may be used in the present invention include polymers of two or more olefin monomers such as ethylene-polypropylene copolymer and copolymers of ethylene or propylene with lower olefins such as butene-1, pentene-1, hexane or octene, as well as copolymers of an olefin monomer and another monomer, such as ethylene-vinyl acetate copolymer (RI 1.47-1.49), ethylene-acrylic acid copolymer, ethylene-methacrylic acid copolymer. Mixtures of two or more different polyolefin copolymers are also contemplated, particularly mixes of LDPE and LLDPE.

Above all, polyethylene resins and blends thereof are preferable, and linear low-density polyethylene (ethylene-α-olefin copolymer) and low-density polyethylene are most preferable. Typical densities for these materials are as follows: 0.904 to 0.912 for ULDPE, 0.913 to 0.933 for LDPE, 0.915 to 0.942 for LLDPE and 0.949 to 0.964 for HDPE. Typical melt flow ratios are as follows: 0.25 up to 150, normally up to 20, typically up to 8 for LDPE; 0.5 up to 50, normally up to 20, and typically up to 10 for LLDPE; and 0.05 up to 30, normally up to 20 and typically up to 8 for HDPE.

The polyolefin resins used in the invention may be obtained by polymerization in a known way, e.g. by the use of a Ziegler catalyst, or obtained by the use of a single site catalyst such as a metallocene catalyst.

Examples of other plastics materials which may be used in accordance with the present invention are as follows, together with the refractive index where known:

| | |
|---|---|
| Poly(vinyl acetate) | 1.467 |
| Epoxy resins | 1.47 |
| Ethyl Cellulose | 1.47 |
| Acetal Homopolymer | 1.48 |
| Acrylics | 1.49 |
| Cellulose Nitrate | 1.49-1.51 |
| Polyallomer | 1.492 |
| Polyvinyl alcohol | 1.50 |
| Ionomers | 1.51 |
| Nylons (PA) Type II | 1.52 |
| Acrylics Multipolymer | 1.52 |
| Styrene Butadiene Thermoplastic | 1.52-1.55 |
| PVC (Rigid) | 1.52.-1.55 |
| Nylons (Polyamide) Type 6/6 | 1.53 |
| Urea Formaldehyde | 1.54-1.58 |
| Styrene Acrylonitrile Copolymer | 1.56-1.57 |
| Polystyrene | 1.57-1.60 |
| Poly(ethylene terephthalate) | 1.575 |
| Polycarbonate (Unfilled) | 1.586 |
| Polyvinylidene chloride | 1.60 |
| Polysulfone | 1.633 |

Preferred amongst these other polymer materials are PVC and epoxy resins. The use of the invention in respect of nylon (6 and 6,6), PET and polystyrene resins are also preferred aspects of the invention.

As previously noted, the polymer composition of the invention includes as a co-opacifier with titanium dioxide, a flash calcined kaolin clay.

Calcined kaolin clay is normally prepared by heat-treating (calcining) a hydrous kaolin clay material. This serves to remove hydroxyl groups from the molecular structure (dehydroxylation). The calcination process typically causes significant modification of the crystal structure of the kaolin, leading to modification of the characteristics of the material. In particular, when a hydrous kaolin is calcined to about 500-600° C., an endothermic reaction occurs. Essentially all of the water associated with the uncalcined kaolin crystals is eliminated and an essentially amorphous (as measured by x-ray diffraction) material called metakaolin results. If the kaolin is heated to higher temperatures, further significant changes occur. The metakaolin undergoes an exothermic reaction (which typically occurs at about 900-980° C.). Such a material is then referred to as a "fully calcined kaolin".

The calcined kaolin used in the present invention is prepared by a flash calcination process, conducted on particles of hydrous kaolin. In the flash calcination process, the hydrous kaolin clay is heated at an extremely fast rate, almost instantaneously, e.g. by exposure to a temperature greater than about 500° C. for a time not more than 5 seconds, and typically less than 1 second. The temperature is suitably in the range of from 550° C. to 1200° C.

Flash calcination of the hydrous kaolin particles (e.g. for less than about 1 second, for less than 0.5 second or for less than 0.1 second) gives rise to relatively rapid blistering of the particles caused by relatively rapid dehydroxylation of the kaolin. Water vapour is generated during calcination, which may expand extremely rapidly, in fact generally faster than the water vapour can diffuse through the crystal structure of the particles. The pressures generated are sufficient to produce sealed voids as the interlayer hydroxyl groups are driven off, and it is the swollen interlayer spaces, voids, or blisters between the kaolin platelets which typify flash calcined kaolins and give them characteristic properties.

The flash calcination process may be carried out by injecting the kaolin clay into a combustion chamber or furnace wherein a vortex is established to rapidly remove the calcined clay from the combustion chamber. A suitable furnace would be one in which a toroidal fluid flow heating zone is established. For example, reference is made here to WO-A-99/24360, the contents of which are incorporated by reference in their entirety.

Following calcination, the flash calcined clay may be comminuted to the desired fineness and particle size distribution. Comminution may be achieved by use of conventional processing techniques such as sand grinding (e.g. wet sand grinding in suspension), milling (e.g. dry ball milling or fluid energy milling), centrifugation, particle size classification, filtration, drying and the like. Wet sand grinding is preferred, in which case the desired particle size reduction is typically achieved after a work input of about 110 kilowatt-hours per tonne, and the kaolin is then preferably filtered, dried at 80° C. and milled to provide the final product.

The flash calcined kaolin used in the present invention typically has a specific gravity lower than hydrous kaolin, for example, equal to or less than 2.4, and desirably equal to or less than 2.2.

The flash calcined kaolin clay used in the invention is in particulate form and may suitably, but not essentially, have a particle size distribution such that at least about 40 weight % is below 2 μm, and preferably up to about 75 weight % is below 2 μm. More preferably, the flash calcined clay has a particle size distribution such that between about 50 and 65 wt. % are smaller than 2 μm. The preferred $d_{50}$ of the flash calcined clay is in the range of from about 1.4 to 2 μm. For example, one presently preferred flash calcined clay for use in the invention may have about 55 wt. % of particles smaller than 2 μm and a $d_{50}$ of about 1.7 micron. In addition, the flash calcined clay for use in the invention may have a surface area in the range of from 5 to 25 m² per gram. (as measured by the BET liquid nitrogen absorption method ISO 5794/1), preferably about 10 to 20 m² per gram, and typically of the order of 12-14 m² per gram.

The particles of the flash calcined kaolin clay used in accordance with the present invention may be coated with an adherent coupling agent, which is preferably an organosilane coupling agents. Examples of suitable organosilane coupling agents include compounds of formula I:

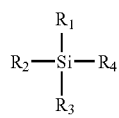
(I)

wherein $R_1$ is an aminoalkyl or mercaptoalkyl group, $R_2$ is a hydroxy, hydroxyalkyl or alkoxy group, and each of $R_3$ and $R_4$, which may be the same or different, is a hydrogen atom or a hydroxy, alkyl, hydroxyalkyl or alkoxy group. Each of $R_2$, $R_3$ and $R_4$ may, for example, be a hydroxy, hydroxyalkyl or alkoxy group, and each of $R_1$, $R_2$, $R_3$ and $R_4$ may, for example, contain not more than 4 carbon atoms. In one example, $R_1$ may be a γ-mercaptopropyl group and each of $R_2$, $R_3$ and $R_4$ may be a methoxy group.

An alternative representation of examples of suitable organosilane coupling agents, which to some extent overlaps with formula I, is given by the following formula II:

$$(R_1O)_2R'—Si—X \quad \text{(II)}$$

wherein R' represents a $C_{1-4}$ alkyl (e.g. methyl or ethyl) group, $R_1$ represents a methyl or ethyl group and X represents a mercaptopropyl group, a vinyl group or a thiocyanatopropyl group.

Still further examples of suitable organosilane coupling agents include compounds of formula III:

$$(RO)_3—Si—(CH_2)_m—S_k—(CH_2)_m—Si(OR)_3 \quad \text{(III)}$$

wherein R represents a $C_{1-4}$ alkyl (e.g. methyl or ethyl) group and m and k are each independently selected from the integers 1, 2, 3, 4, 5 and 6 (e.g. m=3 and k=4).

Still further examples of suitable organosilane coupling agents include compounds of formula IV:

$$X_3SiR \quad \text{(IV)}$$

wherein X represents a $C_{1-4}$ alkoxy (e.g. methoxy or ethoxy) group or a chlorine atom, and R represents a glycidoxy, methacryl, amino, mercapto, epoxy or imide group.

Examples of preferred silanes for use in the invention are γ-aminopropyltriethoxy and vinyl-tris(2-methoxyethoxy)silane.

Preferably, the organosilane will be present in an amount up to about 2% by weight of the calcined clay particles, more preferably from about 1% to about 1.5% by weight.

In addition to the flash calcined kaolin clay, the polymer composition of the invention, and products formed from it, also comprise titanium dioxide in a particlute form as an opacifier and white pigment. Particulate titanium dioxide for use as an opacifier in a polymer composition and products formed therefrom is widely available. Typically, however, the titanium dioxide used in this invention has a median aggregate size in the range of from about 0.2 to 0.35 μm (as measured by x-ray disc centrifuge). Suitable titanium dioxide products which may be used in the invention are the Ti-Pure® range of materials form Du Pont.

The weight ratio of the flash calcined clay to the titanium dioxide in the composition should be in the range of up to about 10:1. More typically, the weight ratio of flash calcined clay to TiO₂ will be no greater than about 1:1. The preferred weight ratio of the flash calcined clay to the titanium dioxide in the composition is from about 1:100 to about 1:1, more preferably from about 1:25 to about 1:1. The presently most preferred range is from about 1:3 to about 1:1.

The polymer composition of the present invention, and plastic products formed therefrom may additionally comprise other particulate opacifying pigments, such as zirconium dioxide, zinc sulfide, antimony oxide, zinc oxide, lithopone (zinc sulfide+barium sulfate), barium sulfate, dolomite, magnesium silicate, calcium sulfate, calcium carbonate, alumina and quartz.

The polymer composition of the invention will normally be formed as a masterbatch (or concentrate) which is then let down, prior to use in a suitable product-forming step. Masterbatch compositions in accordance with the present invention may comprise up to 90 wt. % of flash calcined clay and TiO₂ combined, based on the weight of the masterbatch (g flash calcined clay and TiO₂ per 100 g of masterbatch), typically from 40 to 80 wt. % of the flash calcined clay and TiO₂ based on the weight of masterbatch.

Polymer compositions in accordance with the present invention which are to be used directly in a product-forming step may be prepared (let down) from a masterbatch, as described above, or formed directly to the appropriate composition. Such polymer compositions should comprise a sufficient amount of flash calcined kaolin clay and $TiO_2$ to opacify the resultant composition, and the products formed therefrom. Although dependent on the polymer and the final application of the product, typically, the polymer composition of the invention which is to be shaped into a plastics article may comprise up to about 30% by weight of combined flash calcined clay and $TiO_2$ opacifiers, preferably up to about 10% by weight, and will typically contain at least about 1% by weight of the combined flash calcined clay and $TiO_2$ opacifier. For polyethylene film applications, the amount of flash calcined clay and $TiO_2$ opacifier is preferably in the range of from 1 to 10% by weight.

The polymer compositions of the present invention may comprise further additives, well known in the plastics art. Amongst the further additives which may be included are bonding or tackifying agents, plasticisers, lubricants, antioxidants, Ultraviolet absorbers, dyes, colourants, processing stabilisers and processing aids.

The present invention also contemplates polymer compositions, and products formed therefrom, which further comprise a predominant particulate filler material. For example, moisture permeable, or "breathable" polyolefin film, particularly breathable polyethylene and polypropylene films, comprises a substantial proportion of a inorganic material, normally a calcium carbonate filler, which may be present in an amount of the order of up to about 70 wt. % in the composition from which the film product is formed and in the film itself. It is known that such compositions may also comprise an opacifying amount of a $TiO_2$. In accordance with the present invention, such compositions may also include a flash calcined clay as a co-opacifier in combination with the $TiO_2$.

The polymer resin, flash calcined kaolin clay and titanium dioxide and, if necessary, other optional additives, may be formed into a suitable masterbatch by the use of a suitable compounder/mixer in a manner known per se, and may be pelletized, e.g. by the use of a single screw extruder or a twin-screw extruder which forms strands which may be cut or broken into pellets. The compounder may have a single inlet for introducing the flash calcined kaolin clay, the titanium dioxide and the polymer together. Alternatively, separate inlets may be provided for the opacifier components and the polymer resin. Suitable compounders are available commercially, for example from Werner & Pfleiderer.

As an alternative to forming a single masterbatch, the titanium dioxide and the flash calcined clay may be formed into separate masterbatches, which are then combined and made down in suitable proportions to form the final polymer composition from which the plastics article is to be made.

The polymer composition of the present invention, having an appropriate concentration of opacifier for the intended end use, may be shaped in a suitable molding process to form a plastics product. Examples of plastics products which may be formed from the polymer composition of the invention include polyolefin films, and in particular polyethylene (such as LDPE and LLDPE) films, as well as non-film products such as opaque plastic containers, bottles, etc. The present invention is particularly suited to making plastic film, which may then be used in wide variety of end uses, such as bags, packaging material, wrapping paper, pouches, agricultural film, etc. Such films typically have a thickness which may be in the range of up to 500 μm, more often up to 300 μm, and normally in the range of from 20 to 80 μm.

Plastics products may be formed in a wide variety of shaping procedures, such as, for example, extrusion, injection molding, compression molding, blow molding and casting. The preferred plastic films of the present invention may, for example, be made by casting the film using a flat die or by blow molding the film using a tubular die. The polymer composition of the invention may also be co-extruded into multilayer films with other polymers both in cast and blown film processes. Suitable other polymers for co-extrusion in this respect may be nylon, polyethylene (all types), polyvinyl acetate and polyvinyl alcohol, PVC and PVdC, PET, OPP, as well as suitable adhesive layers In extrusion methods for making plastics film, the film may be extruded onto a set of rollers that smooth and stretch the film. This stretching or orientation stage may, for example, be done in MD only, TD only or both using a variety of flat film orientation processes such as stretching using flat rollers, inter-digitated rollers, tenter frames or tenter chains. The film may be, alternatively oriented using tubular orientation processes (which is normally used for blown film).

In addition the plastic films may be modified to improve surface properties for ease of printing, film lamination, and/or film adhesion using a selection of processes such as: corona treatment, flame treatment, priming or sub-coating, use of adhesives, solvents or coatings.

The invention will now be illustrated with reference to the following non-limiting examples.

EXAMPLE 1

Polyethylene compositions for film production were prepared from three masterbatches, a $TiO_2$ masterbatch nominally comprising 60 wt. % $TiO_2$, a flash calcined clay (hereafter FCC) LDPE/LDPE (50:50) masterbatch nominally comprising 15 wt. % FCC and a silane treated FCC (hereafter TFCC) LDPE/LDPE (50:50)masterbatch comprising 15 wt. % TFCC. The $TiO_2$ masterbatch was obtained as a commercially available product. The FCC masterbatch was prepared using a twin screw extruder at an FCC loading of 15 wt. %, also including an antioxidant in an amount of 0.1 g per 100 g of resin. The FCC had a particle size distribution as follows: 4% larger than 10 μm; 5% larger than 8 μm, 12% larger than 5 μm, 55% smaller than 2 μm, 30% smaller than 1 μm, 15% smaller than 0.75 μ m and less than 5% smaller than 0.5 μm, and a typical $d_{50}$ value of 1.6 μm. The TFCC masterbatch was prepared in the same way as the FCC masterbatch, using a similar FCC to that used for the FCC masterbatch, coated with 2% by weight γ-propyltriethoxysilane.

Final formulations were obtained by dilution of $TiO_2$, FCC and TFCC masterbatches (60%, 15% and 15% by weight respectively) using a twin screw extruder (Baker Perkins MP2000). The polymer system used to dilute the masterbatches was the same 50:50 blend of LDPE and LLDPE used to prepare the FCC and TFCC masterbatches. Antioxidant Irganox 1076 (Ciba) was added at 0.10 g per 100 grams of polymer. All compounding was done at a screw speed of 350 rpm; feed rates to the compounder were adjusted to 8 to 12 kg.h$^{-1}$ to maintain constant torque and stable processing. Selected temperatures of 190 (die),180, 170, 165, 160 and 155° C. were used which allowed a melt temperature at the die of 195 to 197 for FCC compounds and 195 to 201 for TFCC compounds.

Films with a nominal thickness of 50 μm were blown using a Betol SK 32 Line with a screw speed of 56 rpm and a layflat width of 225 mm, which corresponds to a BUR of 2.8.

A variety of films were prepared as detailed in Table 1 below comprising mixes of from 2 to 3.6 wt. % $TiO_2$ and from 0.8 to 2 wt. % FCC (Films 1g to 1g) or TFCC (Films 2b to 2g) together with films comprising 4 wt. % $TiO_2$ or 4 wt. % FCC (or TFCC). These were nominal loadings; the actual filler loadings were also measured by loss on Ignition at 650° C. for 1 hr. Measurement was repeated 5 times for each film formulation and results averaged. All filler loadings are given in Table 1 in weight percentage. The measured filler levels are ±0.4%.

TABLE 1

| Film ID | TiO$_2$ | FCC | Total$_{Target}$ | Filler$_{measured}$ |
|---|---|---|---|---|
| 1a | 4.0 | 0.0 | 4.0 | 3.99 |
| 1b | 3.6 | 0.4 | 4.0 | 3.96 |
| 1c | 3.6 | 0.8 | 4.4 | 4.52 |
| 1d | 3.6 | 1.2 | 4.8 | 4.88 |
| 1e | 3.6 | 1.6 | 5.2 | 5.28 |
| 1f | 3.2 | 0.8 | 4.0 | 4.26 |
| 1g | 2.0 | 2.0 | 4.0 | 4.30 |
| 1h | 0.0 | 4.0 | 4.0 | 4.33 |
| 2b | 3.6 | 0.4 | 4.0 | 4.42 |
| 2c | 3.6 | 0.8 | 4.4 | 4.82 |
| 2d | 3.6 | 1.2 | 4.8 | 5.26 |
| 2e | 3.6 | 1.6 | 5.2 | 5.37 |
| 2f | 3.2 | 0.8 | 4.0 | 3.89 |
| 2g | 2.0 | 2.0 | 4.0 | 5.87 |
| 2h | 0.0 | 4.0 | 4.0 | 4.41 |

Film specimens were conditioned at 23° C. and 50% RH for 48 hours prior to optical and mechanical measurements.

Opacity

Measurement of the opacity of films made with the untreated flash-calcined clay provided the values shown in Table 2 below. Opacity was measured by the contrast ratio method using a Minolta CM-361 Spectrophotometer. Measurements were made using paraffin oil, with a refractive index close to that of LDPE and LLDPE, to eliminate the effect of surface defects on the film (scratches, due to flow instabilities, filler protruding from film) on optical properties. Due to the sensitivity of opacity to film thickness variation the measured opacity values were normalized to a film thickness of 50 μm.

TABLE 2

| Film ID | wt % TiO$_2$ | wt % FCC | L/μm | Opacity | Op$^{corrected}$ |
|---|---|---|---|---|---|
| 1a | 4 | 0 | 52.1 | 68.0 | 67.3 |
| 1b | 3.6 | 0.4 | 50.0 | 65.8 | 65.8 |
| 1c | 3.6 | 0.8 | 50.1 | 66.7 | 66.7 |
| 1d | 3.6 | 1.2 | 49.4 | 66.6 | 66.8 |
| 1e | 3.6 | 1.6 | 47.9 | 66.3 | 67.0 |
| 1f | 3.2 | 0.8 | 51.4 | 66.3 | 65.8 |
| 1g | 2 | 2 | 52.1 | 59.1 | — |
| 1h | 0 | 4 | 48.9 | 19.3 | — |
| 2b | 3.6 | 0.4 | 49.2 | 66.3 | 66.6 |
| 2c | 3.6 | 0.8 | 48.4 | 66.3 | 66.8 |
| 2d | 3.6 | 1.2 | 49.1 | 65.9 | 66.2 |
| 2e | 3.6 | 1.6 | 50.0 | 66.7 | 66.7 |
| 2f | 3.2 | 0.8 | 49.0 | 62.7 | — |
| 2g | 2 | 2 | 48.4 | 65.6 | — |
| 2h | 0 | 4 | 51.4 | 31.0 | — |

Results are also presented in FIG. 1 which shows opacity as a function of the level of FCC for film with 3.6% TiO$_2$. The broken line represents the value at 0% FCC, 4% TiO$_2$. These values indicate that, upon replacement of 10% TiO$_2$, an amount of FCC 4 times that of the replaced TiO$_2$ was sufficient recover the opacity value of the original film.

Transmittance/Colour

The transmittance of the films comprising the untreated FCC was also measured to check the opacity data obtained, as were the haze and clarity. The results obtained are set forth in Table 3 below. Transmittance (T), haze (H), and clarity (C) were measured with a BYK-Gardner Haze Gard-plus meter following a method that conforms to ASTM D-1003 and D-1044. $T_L^C$ is the standardized transmittance for a standard thickness of 50 μm and the target weight of filler. Filler percentage are in weight % and L is the thickness of the film in microns.

TABLE 3

| ID | % TiO$_2$ | % FCC | L/μm | T/% | $T_L^C$ | H | C |
|---|---|---|---|---|---|---|---|
| 1a | 4.0 | 0.0 | 51.3 | 46.9 | 47.8 | >99 | 55.3 |
| 1b | 3.6 | 0.4 | 49.8 | 48.9 | 48.8 | >99 | 62.9 |
| 1c | 3.6 | 0.8 | 49.5 | 48.5 | 48.1 | >99 | 56.3 |
| 1d | 3.6 | 1.2 | 49.8 | 46.5 | 46.4 | >99 | 49.8 |
| 1e | 3.6 | 1.6 | 49.6 | 46.9 | 46.6 | >99 | 42.0 |
| 1f | 3.2 | 0.8 | 50.9 | 47.1 | 47.7 | >99 | 51.4 |
| 1g | 2.0 | 2.0 | 50.8 | 55.2 | 55.7 | >99 | 62.2 |
| 1h | 0.0 | 4.0 | 51.9 | 87.7 | 88.1 | 59.7 | 57.9 |
| 2b | 3.6 | 0.4 | 49.7 | 47.7 | | >99 | 65.0 |
| 2c | 3.6 | 0.8 | 49.7 | 46.0 | | >99 | 53.9 |
| 2d | 3.6 | 1.2 | 50.9 | 47.0 | | >99 | 59.3 |
| 2e | 3.6 | 1.6 | 50.7 | 45.6 | | >99 | 42.4 |
| 2f | 3.2 | 0.8 | 50.4 | 51.8 | | >99 | 72.2 |
| 2g | 2.0 | 2.0 | 50.3 | 48.5 | | >99 | 52.4 |
| 2h | 0.0 | 4.0 | 51.4 | 79.8 | | 78.1 | 59.5 |

Figure 2:
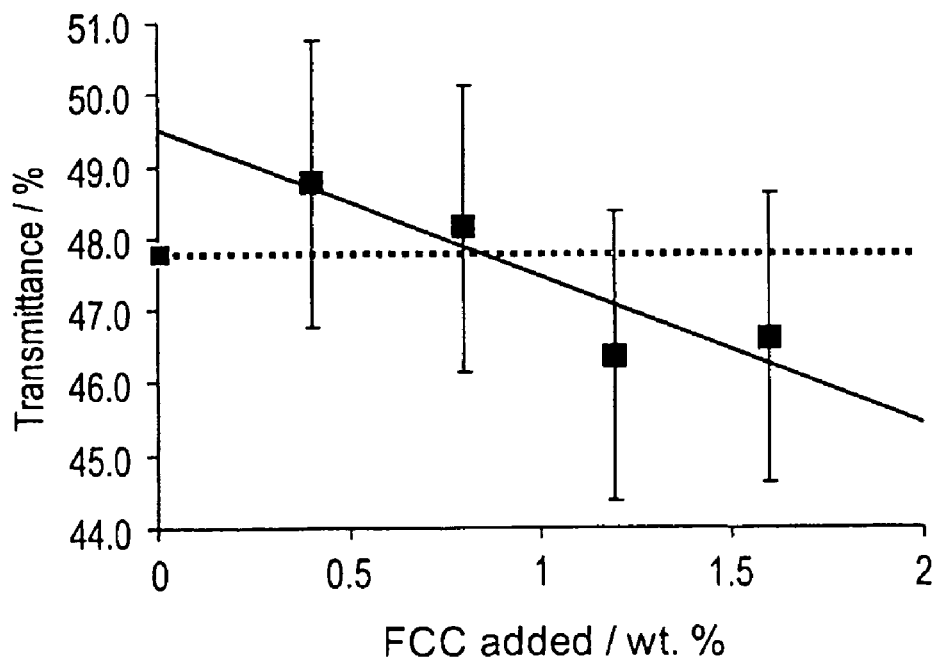
FIG. 2 shows the transmittance of films made in Example 1 containing 3.6% by weight $TiO_2$ as a function of the level of flash calcined clay. The broken line represents the value at 0% flash calcined clay, 4% by weight $TiO_2$.

Results are also presented in FIG. 2 which shows transmittance of films containing 3.6% by weight TiO$_2$ as a function of the level of FCC. The broken line represents the value at 0% FCC, 4% by weight TiO$_2$. All values are normalised to 50 μm film thickness. Error bars correspond to 2 standard deviations. FIG. 2 shows upon replacement of 10% TiO$_2$ the level of transmittance of the original film is recovered when the level of added FCC is approximately 3 to 4 times that of the substituted TiO$_2$. Within experimental error this is in agreement with the observations on film opacity.

Measurements were also made of the colour of untreated FCC-filled film. Colour was measured using Minolta CM-361 Spectrophotometer. Colour measurements of TiO$_2$/FCC films are set forth in Table 4 below. ΔE corresponds to Brightness and is calculated from values of L*, a*, and b*.

TABLE 4

| ID | % TiO$_2$ | % FCC | L* | a* | b* | C* | h | ΔE |
|---|---|---|---|---|---|---|---|---|
| 1a | 4.0 | 0.0 | 96.9 | −0.13 | 2.44 | 2.45 | 93.0 | 3.97 |
| 1b | 3.6 | 0.4 | 96.5 | −0.11 | 2.6 | 2.60 | 92.5 | 4.39 |
| 1c | 3.6 | 0.8 | 96.3 | −0.09 | 2.65 | 2.65 | 92.0 | 4.57 |
| 1d | 3.6 | 1.2 | 95.8 | −0.08 | 2.78 | 2.78 | 91.6 | 5.05 |
| 1e | 3.6 | 1.6 | 95.6 | −0.05 | 2.94 | 2.95 | 91.0 | 5.32 |
| 1f | 3.2 | 0.8 | 96.2 | −0.09 | 2.66 | 2.66 | 92.0 | 4.68 |
| 1g | 2.0 | 2.0 | 95.0 | −0.02 | 3.14 | 3.14 | 90.4 | 5.92 |
| 1h | 0.0 | 4.0 | 87.6 | 0.19 | 5.34 | 5.35 | 87.9 | 13.5 |

Table 4 shows colour parameters for all films containing FCC. Reference to this table illustrates that the addition of FCC to substitute the TiO$_2$ increases the yellowness of the film, as indicated by the increase in b* values with FCC concentration. Changes in L*, a*, and b* are summarised when we observe changes in the brightness values, ΔE. A significant change in brightness is observed with increasing levels of added FCC.

Colour measurements were also made of the treated FCC-filled film. The results obtained are set forth in Table 5 below.

TABLE 5

| ID | % TiO$_2$ | % FCC | L* | a* | b* | C* | h | ΔE |
|---|---|---|---|---|---|---|---|---|
| 2b | 3.6 | 0.4 | 96.5 | −0.14 | 2.47 | 2.48 | 93.3 | 4.31 |
| 2c | 3.6 | 0.8 | 96.4 | −0.13 | 2.67 | 2.67 | 92.9 | 4.46 |
| 2d | 3.6 | 1.2 | 96.1 | −0.14 | 2.65 | 2.66 | 93.0 | 4.72 |
| 2e | 3.6 | 1.6 | 96.2 | −0.13 | 2.88 | 2.88 | 92.5 | 4.78 |
| 2f | 3.2 | 0.8 | 96.6 | −0.14 | 2.68 | 2.69 | 93.1 | 4.36 |
| 2g | 2.0 | 2.0 | 96.0 | −0.13 | 2.92 | 2.93 | 92.6 | 4.93 |
| 2h | 0.0 | 4.0 | 92.6 | −0.19 | 4.52 | 4.53 | 92.4 | 8.66 |

A yellowing test for discolouration at 85° C. in the presence of nitrogen oxides was also conducted on the untreated FCC films. The results of this test (not shown) indicate that after a 2-hour period exposure to NO$_x$ gasses none of the samples showed discoloration.

Mechanical Properties

The mechanical properties of the films were also measured to determine whether these are affected by the level of substitution of TiO$_2$. Tensile strength was measured according to ASTM D 882-91. The results obtained are set forth in Tables 6 (tensile properties of films in machine direction) and 7 (tensile properties of films in transverse direction) below

TABLE 6

| ID | TiO$_2$ | CC | L/μm | El/% | Error | S$_b$/MPa | Error | BF/Nm$^{-1}$ | Error |
|---|---|---|---|---|---|---|---|---|---|
| 1a | 4.0 | 0.0 | 51.2 | 643 | 27 | 28.4 | 2.5 | 1456 | 125 |
| 1b | 3.6 | 0.4 | 50.7 | 602 | 13 | 25.2 | 1.6 | 1300 | 128 |
| 1c | 3.6 | 0.8 | 50.8 | 611 | 27 | 24.8 | 1.8 | 1259 | 106 |
| 1d | 3.6 | 1.2 | 51.1 | 571 | 15 | 24.5 | 1.2 | 1254 | 99 |
| 1e | 3.6 | 1.6 | 53.8 | 582 | 38 | 25.3 | 1.7 | 1357 | 68 |
| 1f | 3.2 | 0.8 | 48.7 | 619 | 12 | 25.8 | 1.1 | 1260 | 94 |
| 1g | 2.0 | 2.0 | 50.5 | 555 | 22 | 29.3 | 2.1 | 1478 | 91 |
| 1h | 0.0 | 4.0 | 49.7 | 556 | 12 | 29.9 | 1.9 | 1486 | 105 |
| 2b | 3.6 | 0.4 | 52.4 | 634 | 24 | 27.5 | 1.5 | 1442 | 103 |
| 2c | 3.6 | 0.8 | 56.2 | 636 | 38 | 25.8 | 1.9 | 1456 | 233 |
| 2d | 3.6 | 1.2 | 54.5 | 636 | 11 | 26.0 | 1.5 | 1420 | 141 |
| 2e | 3.6 | 1.6 | 59.0 | 654 | 27 | 26.5 | 2.2 | 1570 | 194 |
| 2f | 3.2 | 0.8 | 55.6 | 614 | 10 | 26.0 | 1.4 | 1449 | 155 |
| 2g | 2.0 | 2.0 | 57.3 | 647 | 22 | 25.1 | 1.6 | 1443 | 155 |
| 2h | 0.0 | 4.0 | 57.5 | 582 | 27 | 25.1 | 1.7 | 1441 | 73 |

TABLE 7

| ID | TiO$_2$ | CC | L/μm | El/% | Error | S$_b$/MPa | Error | BF/Nm$^{-1}$ | Error |
|---|---|---|---|---|---|---|---|---|---|
| 1a | 4.0 | 0.0 | 51.1 | 609 | 37 | 22.7 | 2.4 | 1154 | 126 |
| 1b | 3.6 | 0.4 | 53.3 | 597 | 18 | 20.6 | 1.6 | 1105 | 114 |
| 1c | 3.6 | 0.8 | 50.9 | 584 | 40 | 20.8 | 2.2 | 1060 | 111 |
| 1d | 3.6 | 1.2 | 52.1 | 586 | 27 | 20.1 | 1.3 | 1048 | 67 |
| 1e | 3.6 | 1.6 | 52.5 | 608 | 31 | 22.2 | 1.7 | 1162 | 83 |
| 1f | 3.2 | 0.8 | 50.8 | 623 | 26 | 23.8 | 1.1 | 1209 | 81 |
| 1g | 2.0 | 2.0 | 51.1 | 571 | 23 | 25.9 | 1.7 | 1324 | 139 |
| 1h | 0.0 | 4.0 | 48.9 | 554 | 34 | 26.1 | 2.7 | 1280 | 188 |
| 2b | 3.6 | 0.4 | 54.0 | 595 | 22 | 22.6 | 1.7 | 1222 | 154 |
| 2c | 3.6 | 0.8 | 55.3 | 607 | 33 | 22.0 | 0.6 | 1218 | 102 |
| 2d | 3.6 | 1.2 | 54.3 | 599 | 27 | 22.5 | 1.3 | 1227 | 142 |
| 2e | 3.6 | 1.6 | 54.8 | 594 | 42 | 22.2 | 2.4 | 1224 | 206 |
| 2f | 3.2 | 0.8 | 55.6 | 615 | 11 | 26.1 | 1.5 | 1453 | 157 |
| 2g | 2.0 | 2.0 | 52.9 | 587 | 38 | 19.7 | 2.6 | 1040 | 156 |
| 2h | 0.0 | 4.0 | 57.1 | 563 | 43 | 18.6 | 2.1 | 1063 | 156 |

Figure 3:
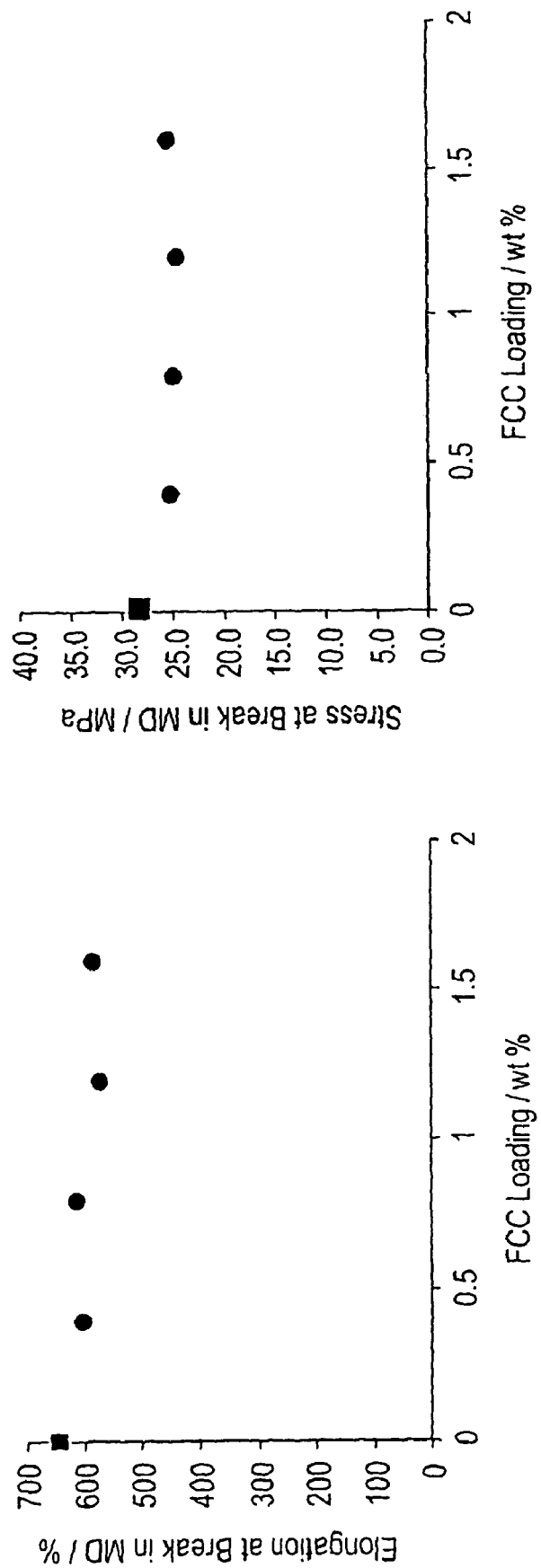
FIG. 3 shows the tensile strength (Elongation at break and Stress at break) properties in MD of polyethylene films made in Example 1 containing 3.6% $TiO_2$ by weight as a function of the level of flash calcined clay. The data point at 0% flash calcined clay contains 4% $TiO_2$.

Reference to FIG. 3 shows that the mechanical properties of the films are not affected by the level of substitution of TiO$_2$. This is the case for all tensile properties in both MD and TD. The values are very similar for films with compositions varying from 4% TiO$_2$ to 4% FCC. This fact reflects the dominant effect of the resin in the tensile properties of these films where it represents 98 to 99% by volume.

In this example it is shown that FCC and silane-treated FCC may be used as a substitute for TiO$_2$ in plastic film. At 10% substitution it is possible to recover the opacity and transmittance of the original 4% TiO$_2$ film by adding extra FCC to the film (3 to 4 times that of the replaced TiO$_2$). Haze is not affected and remains very high. A slight deterioration of colour and clarity is observed. However, addition of FCC does not affect the resistance of the film to discoloration. Mechanical properties of the film are not affected by FCC addition.

EXAMPLE 2

Four different flash calcined clays (FCC1, FCC2, FCC3 and FCC4 having specific gravities of 2.08, 2.19, 2.03 and 1.98 respectively) were compounded into LLDPE having a MFI of 20 using a twin-screw extruder (Baker Perkins MP200) to produce 40 wt. % masterbatches. The processing conditions are set forth in Table 8 below.

TABLE 8

| Masterbatch ID | Temperature/° C. | | | | | | Torque/% |
|---|---|---|---|---|---|---|---|
| | Die | 5 | 4 | 3 | 2 | 1 | |
| FCC1 (SG = 2.08) | 200 | 188 | 177 | 162 | 165 | 150 | 30 |
| FCC2 (SG = 2.19) | 200 | 188 | 177 | 162 | 165 | 150 | 30 |
| FCC3 (SG = 2.03) | 205 | 190 | 178 | 185 | 170 | 165 | 25 |
| FCC4 (SG = 1.98)% | 201 | 177 | 170 | 164 | 165 | 160 | 25 |

All Masterbatches were prepared in Exxon Escorene LLDPE resin LL6101 XR (MFI=20, density 0.924), with antioxidant Irganox1076 added at 0.15 g per 100 g resin. Processing with selected temperatures of 190 (die), 180, 170, 165, 155, and 145° C. Extruder operating at 350 rpm except for FCC4, for which a screw speed of 300 rpm was employed. Throughput was in the range 6 to 8 kg/hr.

These masterbatches, together with a TiO$_2$ masterbatch, were let down with Exxon Escorene LLN1001XV (MFI of 1) to achieve a total filler concentration (FCC and TiO$_2$) of 4 wt % using a Baker Perkins twin screw extruder operating at 350 rpm and a throughput in the range 10 to 14 kg/hr and selected temperatures of 190 (die), 180, 170, 165, 155, and 145° C. For each FCC, compounds were prepared having the following FCC to TiO$_2$ ratios: 40:30, 30:40, 43:27 and 45:25. Filler loading was measured by loss on ignition at 650° C., except for TiO$_2$/CaCO$_3$ films for which 450° C. was used. Irganox 1016 was added as a stabiliser at a level of 0.15 g antioxidant per 100 g of resin. Film processing was carried out using a Betol SK 32 operating at a screw speed of 56 rpm (10 A load) and a haul-off rate of 7 m/min. Film was made at a nominal thickness of 50 micron, and a lay-flat of 225 mm.

Film specimens were conditioned at 23° C. and 50% RH for 48 hours prior to optical and mechanical measurements as in Example 1.

Opacity

Figure 4:
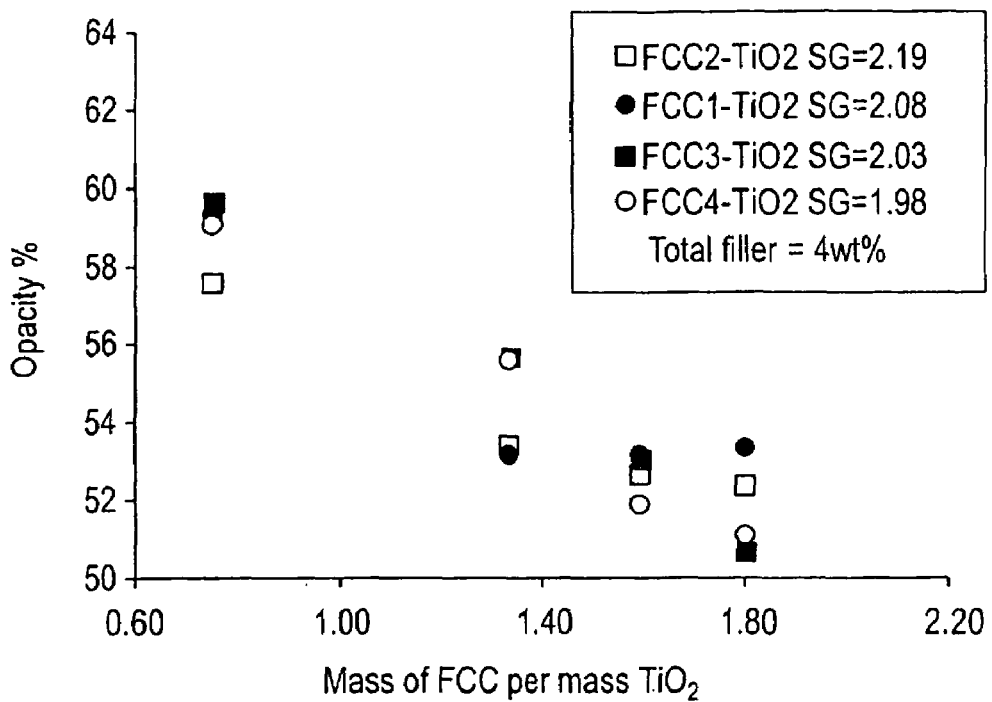
FIG. 4 shows the opacity of $TiO_2$:FCC films made in Example 2 as a function of FCC/$TiO_2$ ratio, for FCCs with specific gravities ranging from 1.99 to 2.19. The total filler loading ($TiO_2$+FCC) was kept constant at 4 wt. %.

The opacity of the TiO$_2$:FCC films as a function of FCC/TiO$_2$ ratio for FCCs with SGs ranging from 1.99 to 2.19 was measured and the results are shown in FIG. 4. All films contain 4 wt. % total filler content. The opacity values are not corrected for filler loading or film thickness and are, therefore, subjected to relatively large errors (±1-2 opacity units).

Transmittance/Colour

Figure 5:
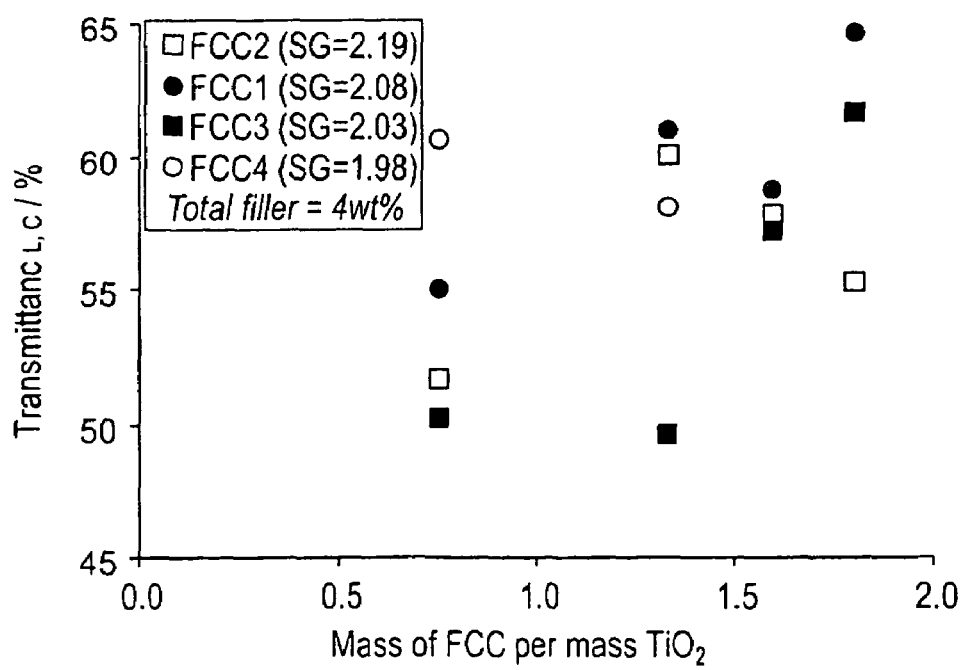
FIG. 5 shows the transmittance of $TiO_2$:FCC films made in Example 2 as a function of ratio of FCC to $TiO_2$ for FCCs with specific gravity ranging from 1.99 to 2.18. The total filler loading ($TiO_2$+FCC) was kept constant at 4 wt. %.

Transmittance was also measured as in Example 1 and the results, obtained for the same films as in FIG. 4 are illustrated in FIG. 5. Transmittance values are corrected for thickness and filler loading. These values were normalised to a film thickness of 50 μm and a total filler loading of 4 wt %. FIG. 5 shows that the reported values are subjected to large errors (this is also evidenced during normalisation of the values for thickness and concentration).

Figure 6:
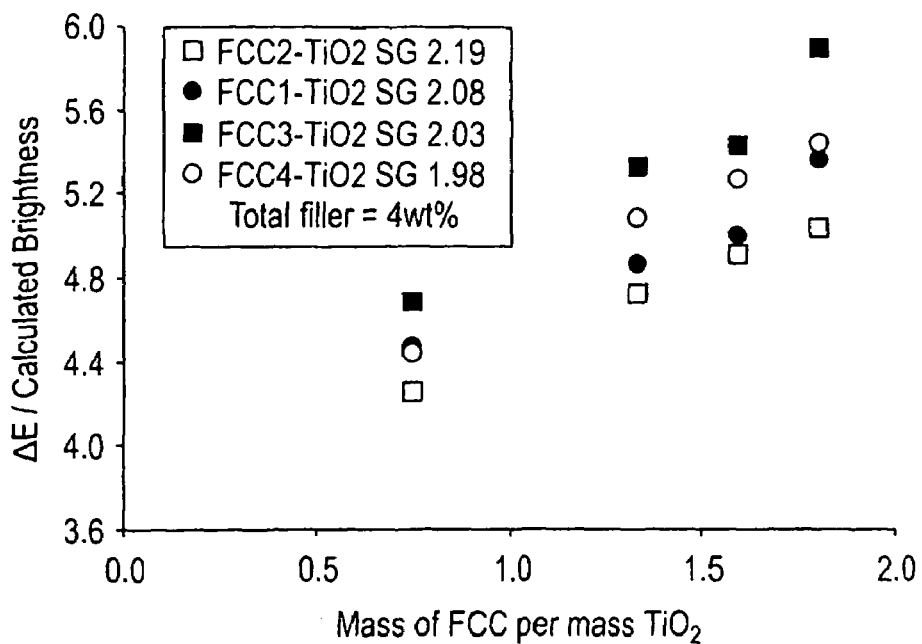
FIG. 6 shows the calculated ΔE values of $TiO_2$:FCC films of Example 2 as a function of ratio of FCC to $TiO_2$ for FCCs with specific gravities ranging from 1.98 to 2.19. The total filler loading ($TiO_2$+FCC) was kept constant at 4 wt. %.

Colour measurements were also made of the films and the results are summarised in FIG. 6, which shows the calculated $\Delta E$ (which takes account of L, a and b values) of $TiO_2$:FCC films as a function of the ratio of FCC to $TiO_2$ for FCCs with specific gravity ranging from 1.98 to 2.19. The composition of films was as for FIG. 4. These results show that increasing the level of $TiO_2$ substitution decreases brightness and increases b values (yellowness).

Mechanical Properties

In order to determine the mechanical properties of the films, the tensile strength and Elmendorf tear strength were measured according to ASTM D 882-91 and ASTM D 1922-94a respectively. QUV (UVA) testing was conducted according to ASTM D 4329-92.

Figure 7:
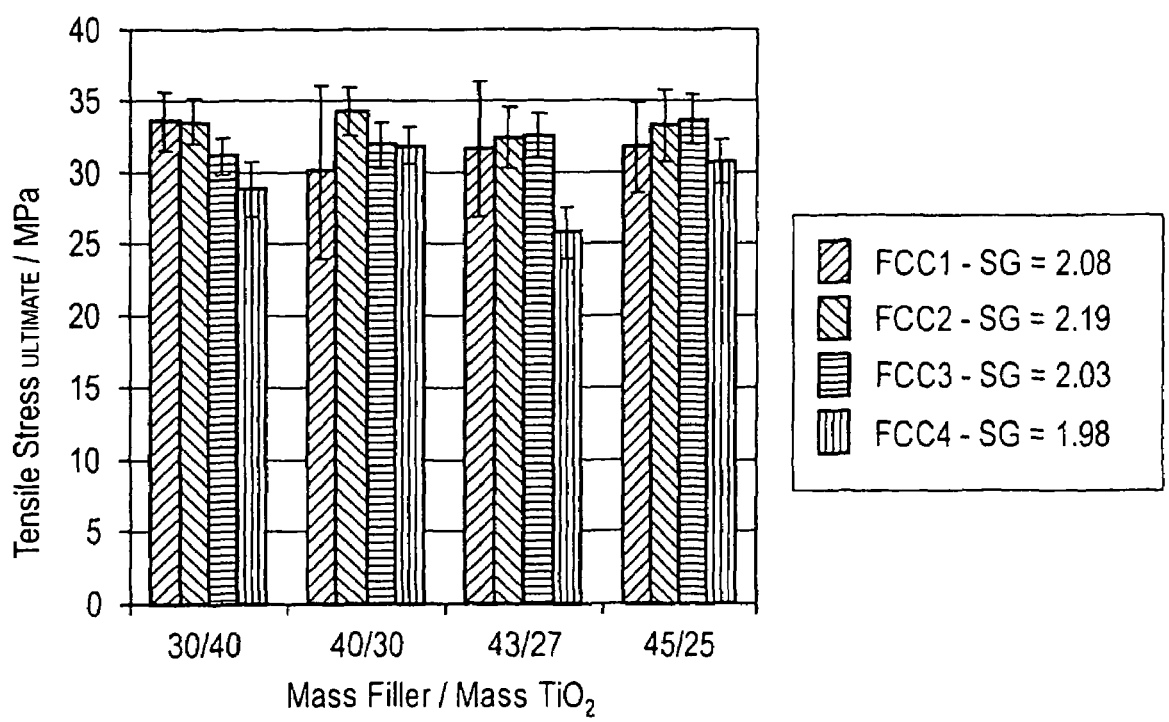
FIG. 7 shows tensile strength at break of $TiO_2$:FCC films of Example 2 as a function of ratio of FCC to $TiO_2$ for FCCs with specific gravity ranging from 1.98 to 2.19. The total filler loading (TiO$_2$+FCC) was kept constant at 4 wt. %.

FIG. 7 shows tensile strength at break of $TiO_2$:FCC films as a function of ratio of FCC to $TiO_2$ for FCCs with specific gravity ranging from 1.98 to 2.19. The composition of films was as for FIG. 4. In FIG. 7, the left hand bar of each group corresponds to FCC1, the left middle bar corresponds to FCC2, the right middle bar corresponds to FCC3 and the right hand bar corresponds to FCC4. Error bars correspond to 2 standard deviations. Within experimental error, tensile strength is not affected by partial substitution of $TiO_2$ by FCC. In addition, reference to FIG. 7 also shows that the SG of the clay has no effect on tensile strength.

Figure 8:
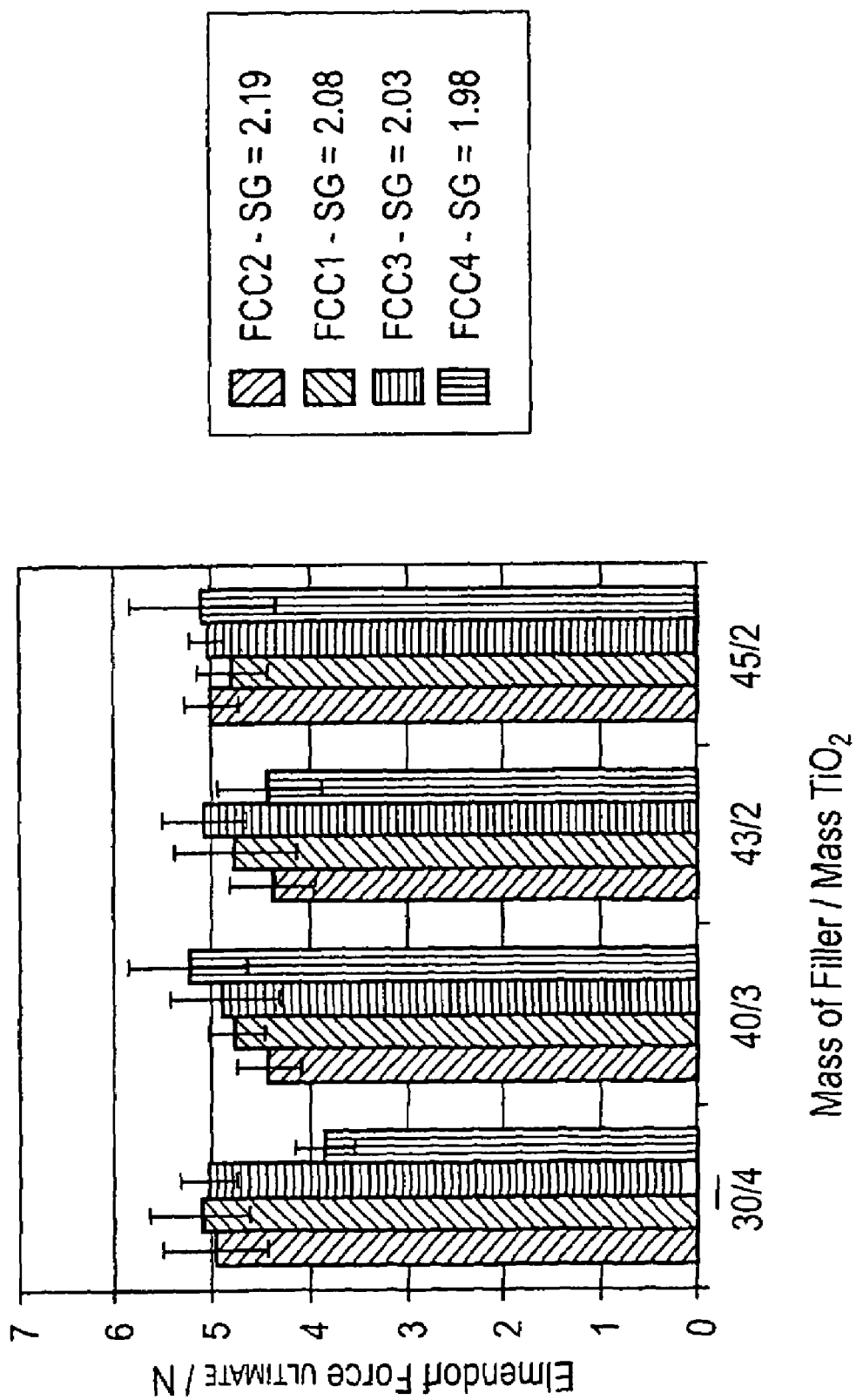
FIG. 8 shows Elmendorf tear strength of TiO$_2$:FCC films of Example 2 as a function of ratio of FCC to TiO$_2$ for FCCs with specific gravity ranging from 1.98 to 2.19. The total filler loading (TiO$_2$+FCC) was kept constant at 4 wt. %.

FIG. 8 shows Elmendorf tear strength of $TiO_2$:FCC films as a function of ratio of FCC to $TiO_2$ for FCCs with specific gravity ranging from 1.98 to 2.19. Again, the composition of films was as for FIG. 4. In FIG. 8, the left hand bar of each group corresponds to FCC1, the left middle bar corresponds to FCC2, the right middle bar corresponds to FCC3 and the right hand bar corresponds to FCC4. Error bars correspond to 2 standard deviations. As with tensile strength partial substitution of $TiO_2$ by FCC has no significant effect on tear strength.

EXAMPLE 3

In this example, the performance of FCC as a partial replacement for $TiO_2$ in two further polymer systems (HDPE having a refractive index of 1.54 and a general purpose polystyrene having a refractive index of 1.59) was evaluated and compared with the results from an additional experiment using LLDPE.

The polymer systems used were:
LLDPE Escorene LL6101XR for masterbatch Escorene LLN1001XV for film blowing
HDPE HTA002
PS Styron 648

The $TiO_2$ used was KRONOS 2500, a rutile-based pigment from Kronos International Inc. The FCC used had a specific gravity of 1.95 as measured by apparent density.

Masterbatches of FCC and Kronos 2500, at 30 and 50 wt. %, respectively were prepared in each resin type. For LLDPE, LDPE and PS a 3 wt. masterbatch of an appropriate antioxidant was also prepared. Irganox HP2215FF was used for LLDPE and HDPE, whereas Irganox 1076 was used for PS (both anti-oxidants from Ciba Specialty Chemicals). Compounds were made in a twin screw extruder (Baker Perkins 2000) operating at 300 rpm screw speed. Temperatures were selected to give melt values of 150° to 180° C. in the feeding zone, and 190° to 205° C. at the die. Throughput rates were chosen to give a torque between 30 and 50%. All compounds were dried in a Conair dryer/desiccator at 60° C. for 8 hr.

Final film formulations were prepared by tumble-mixing appropriate amounts of the masterbatches and unfilled resins. These mixtures were kept dried in a Conair dryer/desiccator for at least 8 hr at 60° C. Films were then blown in a Dr. Collin blown film line. Screw speed was 75 rpm in all cases, with drive-off values of 4.6 m min$^{-1}$ for LLDPE and HDPE, and 10 m min$^{-1}$ for PS. Processing conditions were chosen to give die melt temperatures and melt pressures of ca. 205° C. and 340 bar for LLDPE, ca. 215° C. and 310 bar for HDPE, and ca. 205° C. and 210 bar for PS. Polyethylene films were produced with a nominal thickness of 50 mm and a lay-flat of 225 mm. PS films had a nominal thickness of 25 mm, and a lay-flat of 230-250 mm.

Actual filler loading was measured by LOI at 650° C. for 1 hr in a CEM microwave furnace. Opacity was measured in films of known thickness by the contrast ratio with Minolta CM-361 spectrophotometer, using a 10° measurement angle and standard North sky daylight illumination as light source. Haze, clarity and transmittance were measured in films of known thickness using a Gardner Haze meter following ASTM D-1003 and D-1044. Where possible (Transmittance and Opacity) values were standardised to nominal thickness and nominal filler loading, numerically (for transmittance) or via calibration graphs (for opacity). Colour was measured with a Minolta CM-361 spectrophotometer, using standard 6500 K illumination as the light source and a 10° measurement angle.

Tensile strength was measured according to ASTM D 882-91, using 80 mm-long test pieces both in MD and TD for the PE grades, with a strain rate of 800 mm min−1, and a strain rate of 8 mm min−1 for PS. Elmendorf tear strength was measured according to ASTM D 1922-4a.

The optical and mechanical properties of the films are set forth in Tables 9 and 10 respectively:

TABLE 9

| Description | Filler/% | Op | T | H | C | L | a* | b* | OpL, C | TL, C |
|---|---|---|---|---|---|---|---|---|---|---|
| LLDPE, 4% $TiO_2$ | 4.6 | 69.2 | 42.0 | >99 | 41.8 | 97.0 | −0.39 | 2.01 | 67.3 | 46.1 |
| LLDPE, 3.6% $TiO_2$, 0.4% FCC | 3.8 | 62.6 | 47.8 | >99 | 74.6 | 97.2 | −0.37 | 2.04 | 63.1 | 47.3 |
| LLDPE, 3.6% $TiO_2$, 0.8% FCC | 4.9 | 70.1 | 42.7 | >99 | 39.2 | 97.1 | −0.4 | 2.02 | 68.2 | 46.9 |
| LLDPE, 3.6% $TiO_2$, 1.2% FCC | 4.9 | 69.3 | 43.8 | >99 | 41.3 | 96.9 | −0.38 | 2.08 | 68.7 | 45.3 |
| HDPE, 4% $TiO_2$ | 4.0 | 68.6 | 44.2 | >99 | 1.6 | 98.3 | −0.46 | 1.9 | 68.9 | 44.1 |
| HDPE, 3.6% $TiO_2$, 0.4% FCC | 4.7 | 70.6 | 42.3 | >99 | 0.8 | 97.9 | −0.44 | 2.03 | 66.0 | 48.1 |
| HDPE, 3.6% $TiO_2$, 0.8% FCC | 4.8 | 67.2 | 47.1 | >99 | 1.8 | 97.6 | −0.39 | 2.1 | 64.5 | 50.3 |
| HDPE, 3.6% $TiO_2$, 1.2% FCC | 5.4 | 69.6 | 44.1 | >99 | 1.1 | 97.3 | −0.37 | 2.19 | 65.9 | 48.6 |
| PS, 4% $TiO_2$ | 4.6 | 58.9 | 51.7 | >99 | 91.3 | 96.8 | −0.34 | 1.73 | 53.6 | 60.4 |
| PS, 3.6% $TiO_2$, 0.4% FCC | 4.4 | 52.7 | 60.2 | 95.9 | 94.5 | 96.4 | −0.37 | 1.76 | 52.0 | 62.5 |

TABLE 9-continued

| Description | Filler/% | Op | T | H | C | L | a* | b* | OpL, C | TL, C |
|---|---|---|---|---|---|---|---|---|---|---|
| PS, 3.6% TiO$_2$, 0.8% FCC | 5.2 | 53.6 | 58.1 | 99.0 | 89.8 | 96.3 | −0.37 | 1.8 | 50.7 | 63.3 |
| PS, 3.6% TiO$_2$, 1.2% FCC | 4.4 | 53.3 | 61.0 | 95.8 | 89.5 | 95.9 | −0.41 | 1.77 | 56.0 | 58.5 |

Op—opacity;
T—transmittance;
H—haze;
C—clarity;
OpL, C—opacity normalised for thickness and filler loading;
TL, C—as for normalised opacity.

TABLE 10

| | Tensile Strength in MD | | | Tensile Strength in TD | | | Tear in MD | | Tear in TD | |
|---|---|---|---|---|---|---|---|---|---|---|
| Description | Stress/ MPa | Elo./% | BF/ Nm$^{-1}$ | Stress/ MPa | Elo./% | BF/N m$^{-1}$ | Force/N | F/W/N mm$^{-1}$ | Force/N | F/W/N mm$^{-1}$ |
| LLDPE, 4% TiO$_2$ | 33.0 | 666 | 1583 | 26.2 | 651 | 1322 | 5.31 | 105.3 | 5.40 | 108.6 |
| LLDPE, 3.6% TiO$_2$ 0.4% FCC | 28.0 | 600 | 1320 | 22.1 | 579 | 1045 | 4.62 | 99.0 | 5.14 | 107.4 |
| LLDPE, 3.6% TiO$_2$ 0.8% FCC | 27.0 | 614 | 1358 | 23.1 | 602 | 1117 | 5.04 | 103.7 | 5.61 | 110.8 |
| LLDPE, 3.6% TiO$_2$ 1.2% FCC | 25.8 | 595 | 1220 | 22.3 | 588 | 1100 | 4.83 | 99.4 | 5.21 | 106.3 |
| HDPE, 4% TiO$_2$ | 37.0 | 559 | 1742 | 32.5 | 553 | 1418 | 5.62 | 111.1 | 8.82 | 193.3 |
| HDPE, 3.6% TiO$_2$ 0.4% FCC | 31.3 | 466 | 1336 | 29.5 | 505 | 1321 | 4.35 | 99.2 | 8.77 | 184.4 |
| HDPE, 3.6% TiO$_2$ 0.8% FCC | 33.9 | 445 | 1539 | 30.8 | 536 | 1379 | 4.75 | 101.0 | 8.40 | 191.9 |
| HDPE, 3.6% TiO$_2$ 1.2% FCC | 33.7 | 438 | 1543 | 28.4 | 485 | 1302 | 5.28 | 117.4 | 8.35 | 194.1 |
| PS, 4% TiO$_2$ | 47.2 | 2.68 | 1241 | | | | | | | |
| PS, 3.6% TiO$_2$ 0.4% FCC | 53.5 | 2.85 | 1228 | | | | | | | |
| PS, 3.6% TiO$_2$ 0.8% FCC | 49.4 | 2.61 | 1186 | | | | | | | |
| PS, 3.6% TiO$_2$ 1.2% FCC | 50.8 | 2.81 | 1216 | | | | | | | |

Tensile Strength: stress at break (MPa), Elongation at break (% original length), Breaking factor (N m$^{-1}$), Trouser tear test (Elmendorf) Maximum force (N), Maximum force/width (N mm$^{-1}$).

Figure 9:
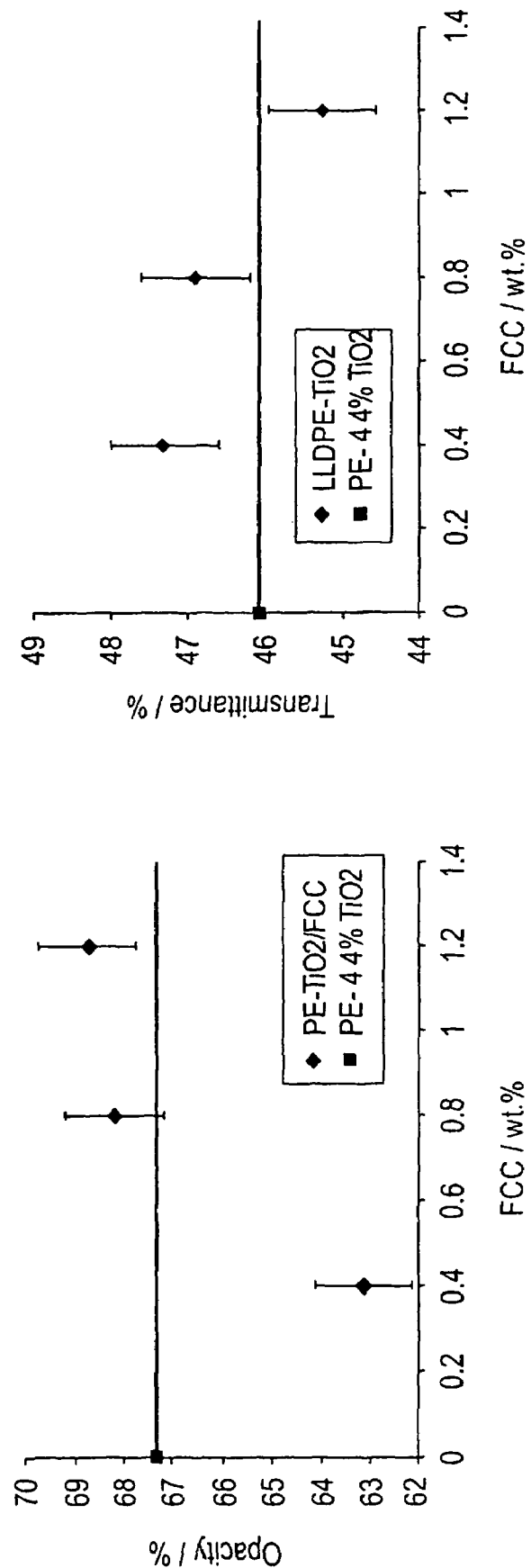
FIG. 9 shows opacity and transmittance (normalised values) of LLDPE/TiO$_2$/FCC films made in accordance with Example 3.
Figure 10:
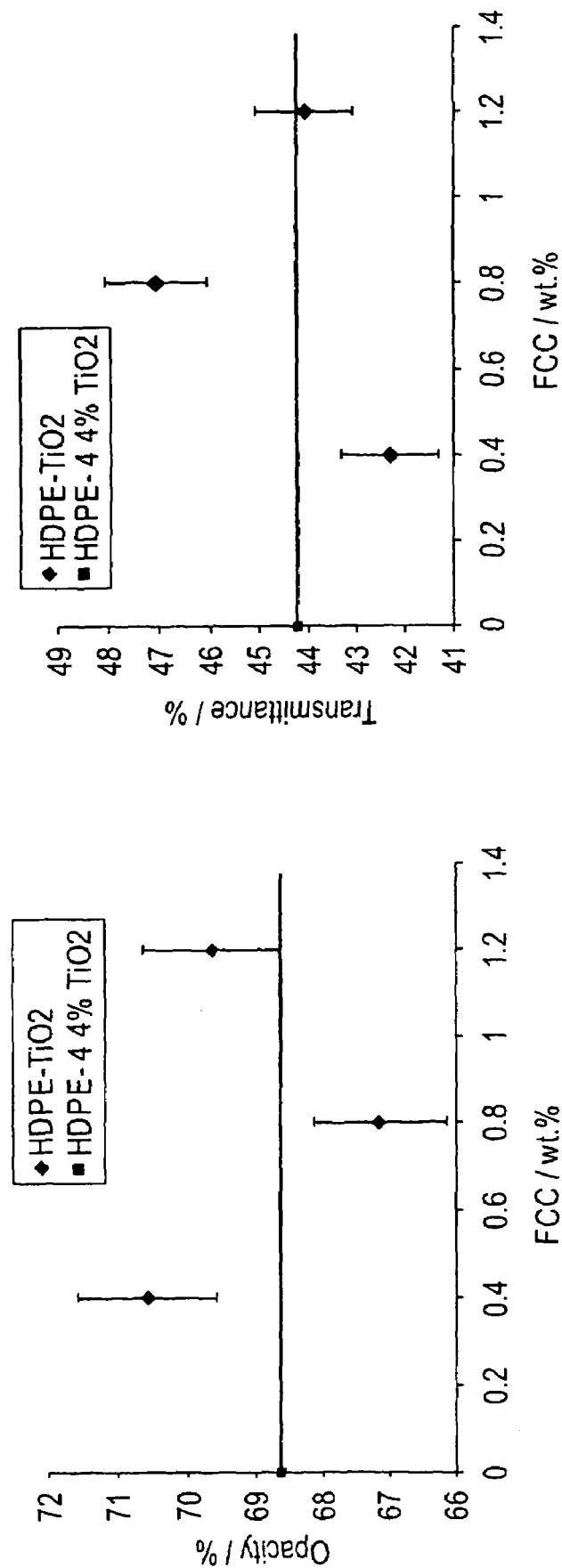
FIG. 10 shows opacity and transmittance (normalised values) of HDPE/TiO$_2$/FCC films made in accordance with Example 3.
Figure 11:
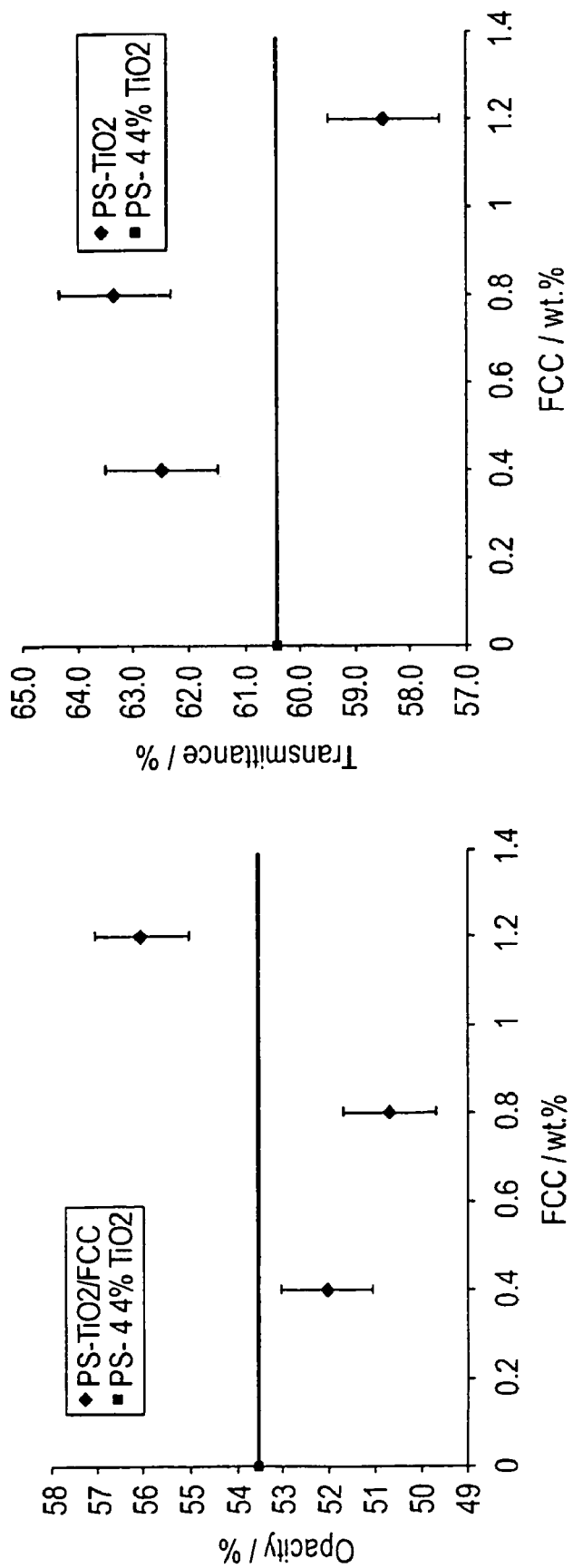
FIG. 11 shows opacity and transmittance (normalised values) of PS/TiO$_2$/FCC films made in accordance with Example 3.

Opacity and transmittance of all films are summarised in FIGS. 9 to 11 based on the data in Table 9. These values have been normalised, by interpolation, to the average film thickness and filler loading of the films to be compared. For HDPE films the values are reported as measured. All values and other properties are listed in the appendix in Table 2.

The LLDPE, HDPE, and PS films of this example contained 3.6% by weight TiO$_2$ and various levels of FCC, which corresponded to replaced TiO$_2$ : added FCC ratios of 1:1, 1:2, and 1:3. The horizontal line corresponded to the reference material, which in each polymer system contained 4% by weight TiO$_2$.

FIG. 9 shows the opacity and transmittance of LLDPE films. The results indicate that the opacity (or transmittance) was recovered when the level of FCC addition was around 2 times that of the replaced TiO$_2$.

For HDPE (FIG. 10), due to large errors in the measurements it was not possible to give a precise value of the ratio needed to obtain equivalent opacity to the reference film. However, the values indicated that the opacity and transmittance of the studied films are of the same order as those of the LLDPE films.

Opacity and transmittance values of PS films (see FIG. 11) showed that these were recovered when the ratio was between about 1:1 and about 1:3.

The colour values of the PE and PS films containing TiO$_2$/FCC blends are summarised in the following table, Table 11.

TABLE 11

| Description | L | a* | b* | DE |
|---|---|---|---|---|
| LLDPE 4% TiO2 | 97.0 | −0.39 | 2.01 | 3.65 |
| LLDPE 3.6% TiO$_2$ 0.4% FCC | 97.2 | −0.37 | 2.04 | 3.48 |
| LLDPE 3.6% TiO$_2$ 0.8% FCC | 97.1 | −0.40 | 2.02 | 3.58 |

TABLE 11-continued

| Description | L | a* | b* | DE |
|---|---|---|---|---|
| LLDPE 3.6% TiO$_2$ 1.2% FCC | 96.9 | −0.38 | 2.08 | 3.75 |
| HDPE 4% TiO$_2$ | 98.3 | −0.46 | 1.90 | 2.59 |
| HDPE 3.6% TiO$_2$ 0.4% FCC | 97.9 | −0.44 | 2.03 | 2.96 |
| HDPE 3.6% TiO$_2$ 0.8% FCC | 97.6 | −0.39 | 2.10 | 3.24 |
| HDPE 3.6% TiO$_2$ 1.2% FCC | 97.3 | −0.37 | 2.19 | 3.50 |
| PS 4% TiO$_2$ | 96.8 | −0.34 | 1.73 | 3.66 |
| PS 3.6% TiO$_2$ 0.4% FCC | 96.4 | −0.37 | 1.76 | 4.03 |
| PS 3.6% TiO$_2$ 0.8% FCC | 96.3 | −0.37 | 1.80 | 4.16 |
| PS 3.6% TiO$_2$ 1.2% FCC | 95.9 | −0.41 | 1.77 | 4.48 |

Reference to this table showed that in all cases, increasing the level of FCC made the film a bit more yellow and slightly less bright. The a values were not significantly changed in LLDPE, become slightly less green in HDPE and slightly greener in PS. In addition, PS films were slightly less yellow than either LLD or HDPE. This may in part be explained by the slightly blue-ish tone of the PS resin compared to LLD or HDPE. A comparison of the reference films with 1:1 substituted films showed that colour differences were small.

Figure 12:
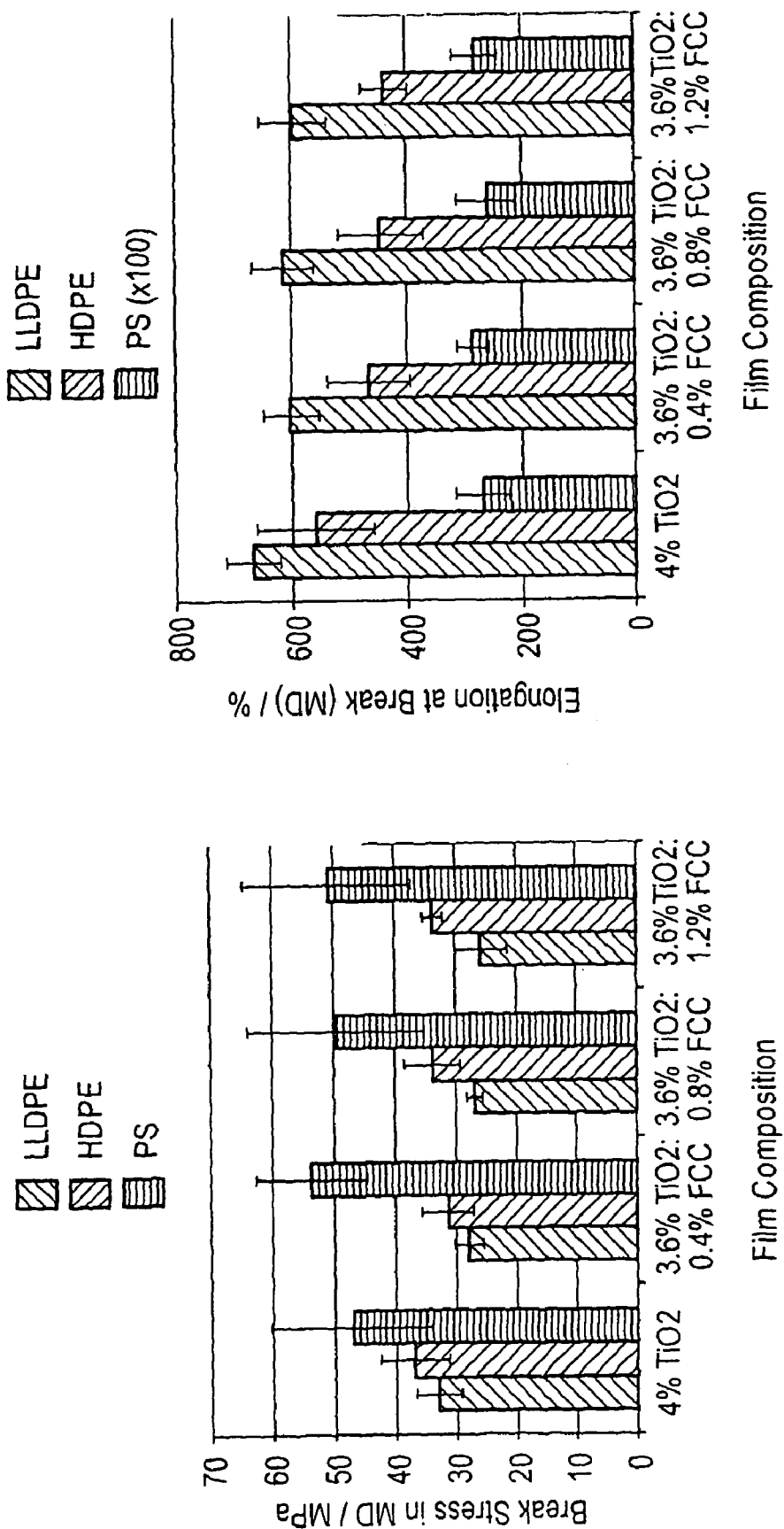
FIG. 12 shows tensile strength properties (MD) of PE films containing TiO$_2$/FCC blends of Example 3. (In this figure, the elongation at break of PS films is multiplied by 100.)
Figure 13:
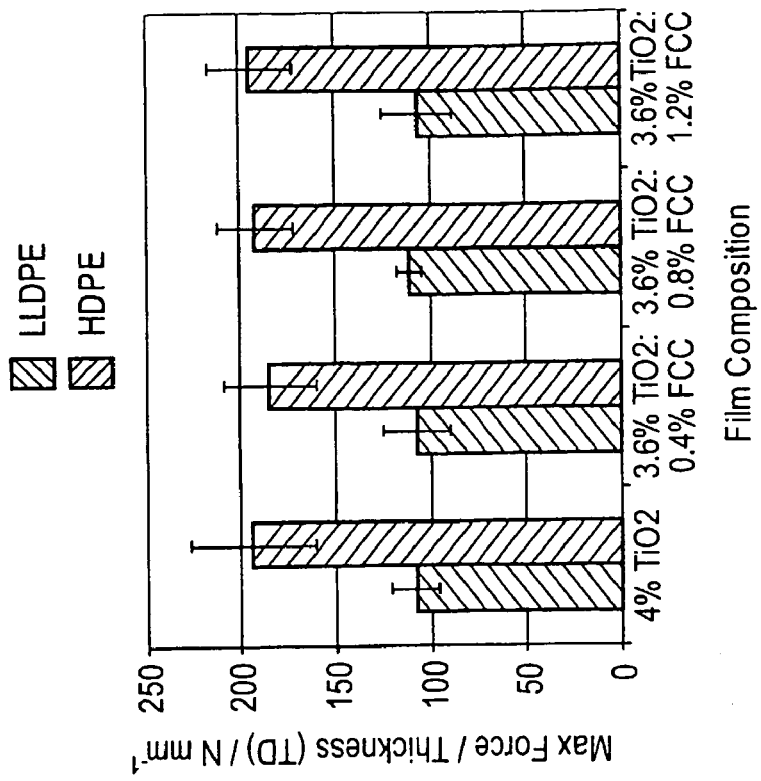
FIG. 13 shows Elmendorf tear test properties of PE films containing TiO$_2$/FCC blends of Example 3.
Figure 13:
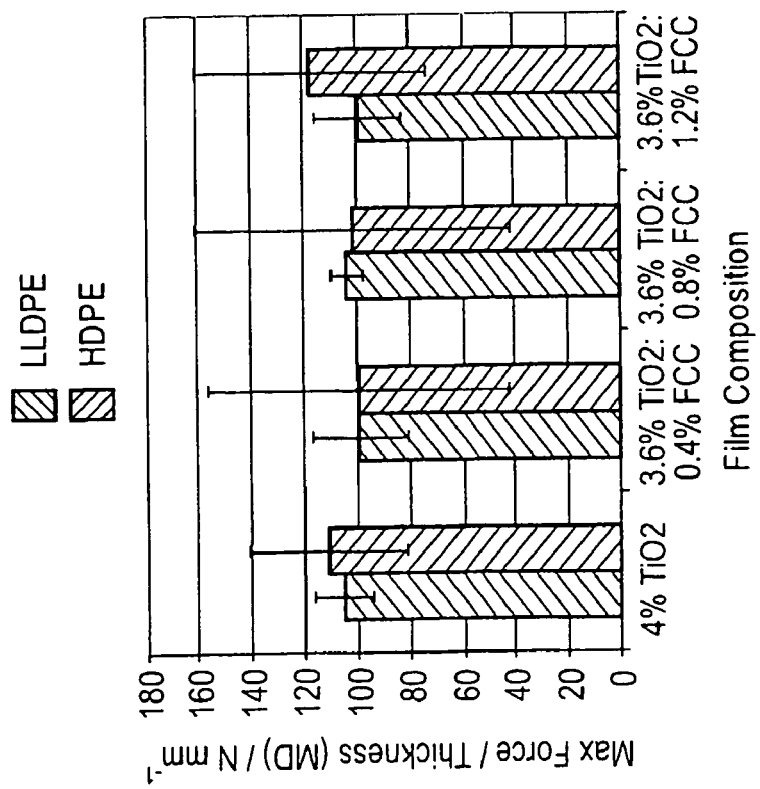

The mechanical properties of the films from Table 10 are displayed graphically in FIG. 12 and FIG. 13. Elmendorf tear strength of PS films was not measured. These results show that, within experimental error (error bars shown correspond to ±2 standard deviations), the addition of FCC as a partial replacement of TiO$_2$ did not significantly change mechanical performance when compared with the reference 4% TiO$_2$ film, in all three of the polymer systems.

All references cited herein are expressly incorporated by reference for all purposes.

The foregoing broadly describes the present invention, without limitation. Variations and modifications as will be readily apparent to one of ordinary skill in this art are to be considered as included within the scope of this application and any subsequent patent(s).

The invention claimed is:

1. A polymer composition comprising a polymer resin, a flash calcined kaolin clay filler and a titanium dioxide filler, wherein a weight ratio of the flash calcined clay to the titanium dioxide in the composition is in an amount less than or equal to about 10:1 and wherein the polymer resin has a refractive index of greater than or equal to about 1.45 when hardened and/or cured to a plastic material.

2. The composition according to claim 1, wherein the polymer resin is a polyolefin resin.

3. The composition according to claim 2, wherein the polyolefin resin is chosen from homopolymers of ethene, propene and butene, and copolymers of ethane, propene, butene, and another monomer.

4. The composition according to claim 3, wherein the polyolefin resin is a polyethylene resin.

5. The composition according to claim 4, wherein the polyethylene resin is chosen from one or more of low density polyethylene, linear low-density polyethylene, middle-density polyethylene, and high density polyethylene.

6. The composition according to claim 5, wherein the polyethylene resin is chosen from one or more of low-density polyethylene and linear low density polyethylene.

7. The composition according to claim 1, wherein the polymer resin is a polyvinyl chloride resin.

8. The composition according to claim 1, wherein the flash calcined clay has a specific gravity less than or equal to about 2.4.

9. The composition according to claim 8, wherein the flash calcined clay has a specific gravity less than or equal to about 2.2.

10. The composition according to claim 1, wherein the flash calcined clay has a particle size distribution such that at least 50 weight % of the particles are smaller than 2 μm.

11. The composition according to claim 1, wherein the flash calcined clay has a particle size distribution such that from about 40 weight % to about 80 weight % of the particles are smaller than 2 μm.

12. The composition according to claim 1, wherein the flash calcined clay has a $d_{50}$ ranging from about 1.4 μm to about 2.0 μm.

13. The composition according to claim 1, wherein the flash calcined clay has a specific gravity of less than or equal to about 2.4, a particle size distribution such that from about 50 weight % to about 65 weight % of the particles are smaller than 2 μm, and a $d_{50}$ ranging from about 1.4 μm to about 2.0 μm.

14. The composition according to claim 1, wherein the flash calcined clay is obtained by exposing a particulate hydrous kaolin clay to a temperature of greater than or equal to about 500° C. for a time less than or equal to 5 seconds.

15. The composition according to claim 1, wherein the flash calcined clay is coated with an adherent coupling agent.

16. The composition according to claim 15, wherein the adherent coupling agent is an organosilane coupling agent.

17. The composition according to claim 1, wherein the titanium dioxide has a median aggregate size ranging from about 0.2 μm to about 0.35 μm.

18. The composition according to claim 1, wherein the weight ratio of the flash calcined clay to titanium dioxide ranges from about 1:100 to about 1:1.

19. The composition according to claim 18, wherein the weight ratio of the flash calcined clay to titanium dioxide ranges of from about 1:25 to about 1:1.

20. The composition according to claim 19, wherein the weight ratio of the flash calcined clay to titanium dioxide ranges from about 1:3 to about 1:1.

21. The composition according to claim 1, wherein the flash calcined clay and titanium dioxide are present in a combined amount up to and including about 80%, by weight relative to the total weight of the composition.

22. The composition according to claim 21, wherein the flash calcined clay and titanium dioxide are present in a combined amount ranging from about 40% to about 80%, by weight relative to the total weight of the composition.

23. The composition according to claim 21, wherein the flash calcined clay and titanium dioxide are present in a combined amount less than or equal to about 30%, by weight relative to the total weight of the composition.

24. The composition according to claim 23, wherein the flash calcined clay and titanium dioxide are present in a combined amount ranging from about 1% to about 10%, by weight relative the total weight of the composition.

25. The composition according to claim 1, further comprising an additional inorganic filler.

26. The composition according to claim 25, wherein the additional inorganic filler is a calcium carbonate.

27. The composition according to claim 1, wherein the polymer resin is chosen from nylon 6, nylon 6,6, poly(ethylene) terephthalate, polyvinyl chloride, and polystyrene.

28. The composition according to claim 27, wherein the polymer resin is a polystyrene resin.

29. A polymer composition comprising a polyethylene resin, a flash calcined kaolin clay and a titanium dioxide, wherein the weight ratio of the flash calcined clay to the titanium dioxide ranges from about 1:100 to about 1:1.

30. The composition according to claim 29, wherein the weight ratio of the flash calcined clay to titanium dioxide ranges from about 1:25 to about 1:1.

31. The composition according to claim 30, wherein the weight ratio of the flash calcined clay to titanium dioxide ranges from about 1:3 to about 1:1.

32. The composition according to claim 29, wherein the flash calcined clay and titanium dioxide are present in a combined amount less than or equal to about 80%, by weight relative to the total weight of the composition.

33. The composition according to claim 32, wherein the flash calcined clay and titanium dioxide are present in a combined amount ranging from about 40% to about 80%, by weight relative to the total weight of the composition.

34. The composition according to claim 32, wherein the flash calcined clay and titanium dioxide are present in a combined amount less than or equal to about 30%, by weight relative to the total weight of the composition.

35. The composition according to claim 32, wherein the flash calcined clay and titanium dioxide are present in a combined amount ranging from about 1% to about 10%, by weight relative to the total weight of the composition.

36. A process for forming a plastic article comprising combining a polymer resin, a flash calcined kaolin clay filler and a titanium dioxide filler, wherein the weight ratio of the flash calcined clay to the titanium dioxide in the composition is in an amount less than or equal to about 10:1 and wherein the polymer resin has a refractive index of greater than or equal to about 1.45 when hardened and/or cured to form the plastic article.

37. The process according to claim 36, wherein the plastic article is a polyolefin film.

38. The process according to claim 36, wherein the plastic article is a polyethylene film.

39. The process according to claim 36, wherein the plastic article is a polystyrene film.

40. A process for preparing a polymer composition comprising a polymer resin, a flash calcined kaolin clay filler and a titanium dioxide filler, wherein a weight ratio of the flash calcined clay to the titanium dioxide in the composition is in an amount less than or equal to about 10:1 and wherein the polymer resin has a refractive index of greater than or equal to about 1.45 when hardened and/or cured to a plastic material, comprising combining the polymer resin, the flash calcined kaolin clay and the titanium dioxide to form a homogenous composition.

41. The process according to claim 40, wherein the flash calcined kaolin clay and the titanium dioxide are mixed with the polymer resin to form a homogenous composition.

42. The process according to claim 41, wherein separate premixes of (a) the polymer resin and flash calcined clay and (b) the polymer resin and the titanium dioxide are formed, and then combined, optionally together with an additional polymer resin.

43. A polymer composition comprising a polyolefin resin and an opacifying amount of a mixture of titanium dioxide and a flash calcined kaolin clay.

44. A polyolefin film comprising an opacifying amount of a mixture of a flash calcined clay and titanium dioxide.

45. A plastic article comprising a polymer composition, said polymer composition comprising a polymer resin, a flash calcined kaolin clay filler and a titanium dioxide filler, wherein the weight ratio of the flash calcined clay to the titanium dioxide in the composition is in an amount less than or equal to about 10:1 and wherein the polymer resin has a refractive index of greater than or equal to about 1.45 when hardened and/or cured to form the plastic article.

46. The plastic article according to claim 45, wherein the plastic article is a polyolefin film.

47. The plastic article according to claim 45, wherein the plastic article is a polyethylene film.

48. The plastic article according to claim 45, wherein the plastic article is a polystyrene film.

* * * * *